Patented May 3, 1949

2,469,314

UNITED STATES PATENT OFFICE 2,469,314

CATALYST FOR CRACKING HYDROCARBONS

Lloyd B. Ryland, El Cerrito, and Miroslav Tamele, Oakland, Calif., assignors to Shell Development Company, San Francisco, Calif., a corporation of Delaware No Drawing. Application October 23, 1945, Serial No. 624,100

2 Claims. (Cl. 252—455)

This invention relates to the catalytic conversion of hydrocarbon oils into lower boiling normally liquid and normally gaseous products and to an improved contact agent for carrying out said conversion. More specifically, the invention relates to the catalytic cracking of normally liquid hydrocarbon oils of either synthetic or natural origin with a particular new and improved specific type of catalyst.

The art of catalytic cracking is very extensive and quite well developed. There are many important factors involved, however, which are little understood. Most of them deal with the catalysts. This phase of the development is still largely of an empirical nature. Numerous catalysts have been prepared and tested and a great many of them have been found which catalyze cracking. However, the mere ability to catalyze cracking is far from sufficient to make a catalyst useful for practical application. Of the catalysts coming into practical consideration a synthetic silica-alumina composite catalyst is of the most importance. This particular type of catalyst is used throughout the industry and is the only synthetic catalyst which is in commercial use at present for catalytic cracking.

In catalytic cracking with this catalyst various other reactions such as hydrogen transfer, polymerization, isomerization of olefins and aromatization, some of which are not completely understood, take place to various and appreciable extents, and, as a result, the products obtained by catalytic cracking with this catalyst are quite different in properties than those produced by thermal cracking and by cracking with other types of catalysts. The silica-alumina catalyst also finds some application under specific conditions for effecting certain of these named reactions more or less selectively; for example, the isomerization of olefins, the polymerization of olefins, and the transfer of hydrogen from a hydrogen-rich molecule to a molecule poorer in hydrogen. In all of the above-mentioned applications of the silica-alumina catalyst the reactions are carried out at elevated temperatures.

While this silica-alumina catalyst is superior in many ways to the hitherto-used clay catalysts and is fairly satisfactory it is far from perfect. Aside from the above-mentioned desirable reactions, various side reactions take place, some of which are undesirable. One result of such undesired side reactions is the formation of heavy carbonaceous materials which deposit on the catalyst and block the catalytic surface. These carbonaceous deposits are commonly referred to as coke or carbon. The production of coke or carbon in effecting any of these desired conversions with silica-alumina catalyst is particularly undesirable. The formation of coke, it is found, takes place very rapidly at first and then takes place more slowly. Thus, the catalyst particles, which are normally white, become black in a matter of a few seconds of use. Since the coke deposits almost immediately upon the catalyst surface on contact with the reactant, the catalyst is at least partially deactivated throughout substantially all of its time in the reactor. As a result of the coke formation it is necessary to regenerate the catalyst at frequent intervals. This is effected in practice by burning off the carbonaceous deposits after every few minutes of use. It is impossible to completely free the catalyst of reactant and product before the regeneration and consequently, in spite of efficient stripping, there is a considerable loss of reactant and/or product by burning in the regeneration step. The amount of reactant and/or product occluded in the catalyst and burned in the regeneration step, it is found, also depends somewhat on the coke content of the catalyst. The coke deposit, particularly when it is thick on the surface of the catalyst, tends to adsorb or absorb and tenaciously hold considerable amounts of reactant and/or product. The losses of reactant and product due to coke formation are, furthermore, often considerable. For example, in catalytic cracking between 8% and 10% by weight of the charge is usually converted to coke which is subsequently burned in the regeneration step. This not only represents a large waste of material but makes regeneration a major problem. The difficulties caused by the formation of coke by the catalyst are also reflected in other ways. Thus, the more coke that is formed the more severe and thorough the stripping must be. In order to obtain efficient stripping, steam is used as a stripping agent. However, steam at elevated temperatures is detrimental to the silica-alumina catalyst and thus the deposition of coke results indirectly in a short effective catalyst life. It may be safely said that the problem of reducing coke formation has been recognized as the major problem confronting the users of such catalyst.

Much research and development work was carried out by various interested groups in the development of the presently-used silica-alumina catalyst. It may be mentioned that the study and development of this catalyst was largely cooperative rather than competitive. One of the primary desired objects of such work was to provide a catalyst having a high selectivity, i. e. having a small coke forming tendency. Another desired object was to provide a catalyst having a good stability against deactivation in use. During use the catalyst is subjected to the action of steam at relatively high temperatures in the reaction step and particularly in the stripping step and catalyst regeneration step. Under such conditions the catalytic activity of all of the hitherto-known silica-alumina catalysts is lowered in a relatively short time. This makes frequent replacement of the catalyst necessary. Still another desired object of the research and development work was to provide a catalyst of good activity. In the application of silica-alumina catalysts the activity or effectiveness of the catalysts is known to be proportional to the amount of available surface in the reaction zone. Thus, the activity or effectiveness of the catalyst may be increased by increasing the specific activity (i. e., activity per unit of surface) or by increasing the available surface.

Since the activity or effectiveness of the catalyst is proportional to the extent of available surface of the catalyst, the development of the prior art catalysts was towards the production of catalysts having very large specific surfaces (i. e. surface per unit weight of catalyst). By suitable adjustment of the various factors entering into the procedure of preparation the presently-used silica-alumina catalyst having a very extensive surface was developed. This catalyst is characterized by having fairly uniform and very fine pores. Thus, the average diameter of the pores of the present commercial catalyst is in the order of 20Å to 40Å. Also, since the weight of available surface which can be packed into a reaction zone of any given size depends upon the density of the catalyst, the development was towards a catalyst of high density. Thus, if the activity of a given volume of catalyst is plotted vs. density of the catalyst, a uniformly increasing activity is noted as the density is increased until, at a point corresponding to a very high particle density the curve breaks and falls off with further increase in density. Thus, the present commercial catalyst has a particle density above 1.00 and often about 1.30–1.40 which is near the maximum of this curve: The particle density is defined as the density of the catalyst particles including the pores and is measured on the dried and calcined catalyst particles. This is not to be confused with the so-called bulk density—sometimes called apparent density—which includes also the free space between the catalyst particles and is therefore affected by the size, shape, and packing of the particles.

It will be appreciated that in such composite catalysts the properties of the finished catalysts are roughly parallel to and largely controlled by the properties of the silica component. Silica hydrogels which give silica gels having the desired high density, large surface and small pores were impregnated in various manners with various amounts of alumina. The results indicated that while a small amount of alumina in the order of 10% was essential for high activity the selectivity of the catalyst decreased with increasing alumina concentrations, i. e. as the concentration of alumina was increased the coke forming tendency of the catalyst was increased (this was postulated to be due to the predominantly dehydrogenating activity of alumina). Consequently, an alumina content in the order of 10–14% was chosen as optimum and the presently-used commercial catalyst is made accordingly.

We cooperated over a period of years in the development of the presently-used silica-alumina catalyst, confining our attention principally to the theoretical aspects of the problems and to the evaluation of many of the numerous factors involved in the preparative procedure and the physical and chemical properties of the catalyst surface. Although this work led primarily to the explanation and better understanding of observed results and behavior, it has now also led to the discovery of a catalyst which allows the catalytic cracking of various hydrocarbon oils to be carried out more selectively and in a more efficient manner.

According to the process of the present invention, various normally liquid hydrocarbon oils of natural or synthetic origin are catalytically cracked to produce normally liquid and/or normally gaseous hydrocarbon products by contacting said oil under cracking conditions of temperature and time with a special type of synthetic silica-alumina composite catalyst which differs from the hitherto-known and used silica-alumina catalysts and is characterized by the following combined physical and chemical properties. The catalyst consists essentially of silica and alumina, i. e. any third components, if present at all, are present in very minor amounts such, for example, as traces of impurities. The available surface of the catalyst is at least 400 square meters per gram and preferably somewhat higher, for example 450 to 550 square meters per gram. The density of the catalyst is considerably below normal, the particle density being below 0.95 and usually in the order of 0.71 to 0.89. The alumina content, based on the dried composite, is above normal, being between 18% and 38% and preferably about 20% to 35%. The average diameter of the pores in the catalyst is considerably above normal, being at least 50Å and preferably between 55Å and 75Å. (The average pore diameter may be calculated by the formula $$D = \frac{4V}{S}$$

wherein D is the average pore diameter in Ångstroms, V is the pore volume in cc./gm., and S is the specific surface in square meters per gram. This figure, regardless of its absolute accuracy, is dependent upon and expresses the openness of the submicroscopic catalyst structure.) We are fully aware of the fact that catalysts having one or another of the above characteristics individually have been prepared and tested for catalytic cracking. These catalysts, however, have uniformly given poor results in one regard or another in catalytic cracking. This is because each of them lacked one or more of the above characteristics found to be essential. Thus, for example, catalysts prepared by incorporating high concentrations of alumina with high density silica gels have been tested. However, the results clearly showed that the selectivity was decreased. Catalysts prepared by combining high concentrations of alumina with low density silica gels have been tested. However, these catalysts did not have sufficient surface area or pore size and gave low activities. Failure to produce and properly test a catalyst having all these characteristics combined was due to the general belief that most of these characteristics were undesirable, as indeed they were indicated to be when taken singly.

It has been found that when catalytic cracking is carried out using a silica-alumina catalyst having all of the above characteristics the selectivity of action is much improved. This is manifested by a lower rate of formation of carbonaceous deposits. Also, the stability against deactivation under the conditions required for processing, stripping and regeneration is much improved. This is manifested by an appreciably slower rate of catalyst activity decline. Also, the specific activity of the catalyst is appreciably higher. It will be appreciated that although the presently-used type of commercial catalyst is one of the best of the hitherto-known catalysts, a considerable number of somewhat related catalysts have been experimented with and are described in the art. These other catalysts, although they may be superior to the present commercial catalyst in one respect or another, are less successful in other respects and are therefore inferior. Thus, while catalysts are known which may be equal in effectiveness to the catalyst of the present invention in any one given respect, none of them, as far as known, has combined the more important advantages of the catalyst used in the process of the present invention.

The above-specified characteristics of the catalyst used in the process of the invention are obtained by adjustment and control of the various interdependent factors involved in the catalyst preparation. The more important factors which affect the physical properties of the finished catalyst are:

1. The general method of forming the silica hydrogel.
2. The particular reagents used in forming the silica hydrogel.
3. The concentrations of the reagents used in forming the silica hydrogel.
4. The manner of combining the reagents in forming the silica hydrogel.
5. The pH conditions in forming the silica hydrogel.
6. The temperature conditions in forming the silica hydrogel.
7. The time of aging of the silica hydrogel.
8. The extent and temperature of washing of the silica hydrogel.
9. The general manner of incorporation of the alumina.
10. The pH conditions in incorporating the alumina.
11. The time, temperature and pH conditions of aging of the silica-alumina hydrogel.
12. The time and temperature of drying of the catalyst.
13. The time and temperature of calcination to produce the finished catalyst.

As a result of the extensive amount of work done on the influence of these factors in the production of silica gels and of silica-alumina catalysts derived therefrom, the influence of these various factors is well known by those skilled in the art. Once given the above-specified characteristics, those skilled in the art will therefore be able, without experimentation, to produce the specified catalyst by a considerable number of modified procedures. A detailed consideration of each of these factors, many of which are interrelated, will therefore not be given. It is, nevertheless, considered advisable to point out certain details regarding a few of these factors which might not be fully appreciated.

Regarding factor 1, in order to produce catalysts having the specified properties the general method used in preparing the silica hydrogel is that in which a silica hydrosol is first prepared and allowed to set to the hydrogel. (In forming the hydrosol a small amount of a gelatinous precipitate may be formed. This may be avoided in most cases by mixing the reagents very rapidly with efficient stirring.)

Regarding factors 2 to 8, these are adjusted and controlled according to their known effects to give a silica hydrogel, which, if dried and calcined, gives a silica gel of low or medium density rather than a high density as hitherto considered desirable. While low density silica gels can be prepared easily under a variety of conditions only the silica hydrogels produced in the low pH range and not the high pH range are considered suitable for the preparation of the present catalyst as they are the only ones that give a final catalyst of large average pore diameter combined with high surface area.

Regarding factor 8, the silica hydrogel may be washed free or substantially free of soluble materials prior to incorporating the alumina, or in some cases the silica hydrogel containing soluble salts may be directly impregnated with alumina and then washed free of impurities.

Regarding factor 9, it is important that the alumina be combined with the hydrous silica gel by impregnation followed by precipitation in situ. If the silica hydrogel is converted to a dry gel prior to impregnation, or if the alumina is combined by other methods than precipitation in the hydrous silica gel, catalysts having other properties and usually lower activity are obtained.

Regarding factors 10 and 11, the pH conditions of the precipitation of the alumina compound in the silica hydrogel in the preparation of catalysts of the prescribed composition are particularly important. If the precipitation is carried out at a final pH below about 6, a catalyst having the prescribed characteristics is not usually obtained. In general, the final pH of the precipitation should be above 6, and is preferably about 6.5.

The impregnation of the hydrous silica gel may be effected by slurrying and intimately mixing the silica hydrogel with the proper amount of a solution of a soluble aluminum salt such as aluminum chloride, aluminum sulfate, aluminum nitrate or the like and then adding a base to precipitate the aluminum as aluminum hydroxide. In some cases the soluble products may be removed after drying by volatilization or decomposition. In most cases however the soluble products are removed by washing. The material, after drying, may be calcined at a temperature in the order of 300–600° C. to impart a high initial activity. However, such precalcination is not essential since the catalyst is subjected to such temperatures during use.

The process of the invention is applicable for the catalytic cracking of various hydrocarbon oils irrespective of source. The catalytic cracking may furthermore be carried out in any one of the various systems hitherto used or proposed, including fixed bed systems, moving bed systems, fluidized catalyst systems and suspensoid systems. For these purposes the catalyst may be prepared in the form of granules, or formed pellets of any desired shape, or in the form of fine powder.

The catalytic cracking may be carried out at temperatures ranging from about 375° C. to about 600° C. and under any desired pressure ranging from subatmospheric pressure up to several hundred atmospheres. The contact time of the oil with the catalyst is adjusted in any case according to the conditions, the particular oil feed and the particular results desired to give a substantial amount of cracking to lower boiling products. The catalytic cracking may be carried out in the presence of various special agents such as alkyl halides, hydrogen sulfide, steam, hydrogen, air and the like.

The catalyst may be regenerated in the usual manner by burning off carbonaceous deposits. Although the catalyst made by the above procedure is appreciably more stable against deactivation by heat and steam than the presently-used commercial catalyst, it is nevertheless advisable to exercise the usual precautions against excessive overheating, etc.

Example I

A 2.3 N aqueous solution of sodium silicate (Philadelphia Quartz Company E Brand) was added with rapid stirring to an equal volume of 6.3 N aqueous sulfuric acid (temperature about 32° C.). A silica sol (pH 0) resulted which set to a very firm hydrogel in about one hour. The hydrogel after aging 21 hours at about 22° C. was broken up into large chunks and leached at about 22° C. for 25 hours with distilled water adjusted to a pH of about 4 by the addition of a small amount of sulfuric acid. The hydrogel was then leached at about 22° C. for 48 hours with distilled water adjusted to a pH of about 8 by the addition of a small amount of ammonium hydroxide. The silica hydrogel was suspended in 1.0 M aqueous aluminum chloride of sufficient volume so that upon precipitation a catalyst of about 25% alumina content would result. To this mixture was added with vigorous stirring 2.93 N aqueous ammonium hydroxide until a pH of 6.5 was attained. The slurry was filtered and washed with distilled water until the filtrate was substantially chloride free. The washed material was then dried for 40 hours at 120° C. and finally calcined for 6 hours at 565° C. in an atmosphere of dry air. The resulting catalyst had the following properties:

| | | |
|---|---|---|
| $SiO_2$ content (dry basis) | per cent | 76.7 |
| $Al_2O_3$ content (dry basis) | do | 23.3 |
| Particle density | gm./cc | 0.755 |
| Specific surface | m.$^2$/gm | 453 |
| Average port diameter | Å | 78.1 |

This catalyst was used for the catalytic cracking of a West Texas gas oil having the following properties:

| | |
|---|---|
| Gravity, A. P. I. | 30.7 |
| A. S. T. M. boiling range ° C | 260–369 |
| Aniline point | 70.2 |
| $n_d^{20}$ | 1.4849 |
| $d_4^{20}$ (vac.) | 0.8689 |
| Bromine number | 6 |
| Carbon per cent weight | 85.65 |
| Hydrogen do | 12.86 |
| Sulfur do | 1.36 |
| Nitrogen do | 0.10 |

The catalytic cracking was carried out under the following fixed bed conditions:

| | |
|---|---|
| Temperature ° C | 500 |
| Liquid hourly space velocity | 4 |
| Pressure | atmospheric |
| Process period hour | 1 |

The activity of the catalyst was 121% compared to an equal weight of a standard catalyst. The specific activity (activity per unit surface area) was 170% of that of the standard catalyst. The amount of carbonaceous deposit formed was about 22% of that produced with the standard catalyst at the same depth of cracking.

Example II

A 2.3 N aqueous solution of sodium silicate (Philadelphia Quartz Company E Brand) was added with rapid stirring to an equal volume of 6.3 N aqueous sulfuric acid (temperature about 21° C.). The resultant silica sol (pH 0) set to a firm hydrogel in a little less than 1 hour. The hydrogel after aging for about 24 hours at about 21° C. was broken up into large chunks and leached for about 48 hours with distilled water adjusted to a pH of 4 by the addition of a small amount of sulfuric acid. The hydrogel was leached at about 21° C. for about 48 hours with distilled water adjusted to a pH of 8 by the addition of a small amount of ammonium hydroxide. The moist hydrogel was then slurried with sufficient aqueous aluminum chloride (about 1 M) so that on precipitation a catalyst containing about 25% alumina would result. Aqueous 3 N ammonium hydroxide was added slowly with vigorous stirring until the pH of the slurry was about 6.4. The material was then filtered and washed with distilled water until the wash water was substantially free of chloride. The material was then dried for about 48 hours at 120° C., broken up into particles passing a 6 mesh standard sieve and retained on a 14 mesh standard sieve. The particles were then heated for two hours at 300° C. to remove excess water and finally calcined for 6 hours at 565° C. The catalyst had the following average properties:

| | | |
|---|---|---|
| Silica content (dry basis) | per cent | 75.8 |
| Alumina content (dry basis) | do | 24.2 |
| Specific surface | m.$^2$/gm | 493 |
| Particle density | gm./cc | 0.885 |
| Average port diameter | Å | 56.3 |

This catalyst was used for the catalytic cracking of the West Texas gas oil described in Example I under the conditions described in Example I. The activity of the catalyst was 121% of that of an equal weight of a standard catalyst. The specific activity of the catalyst was about 156%, as compared to the specific activity of the standard catalyst. The amount of carbonaceous deposits formed was about 73% of that formed by the standard catalyst, at the same depth of cracking.

The standard catalyst used as a basis of comparison had the following properties: (Fresh catalyst precalcined at 565° C. for 6 hours.)

| | |
|---|---|
| Silica content (dry basis) | 89 |
| $Al_2O_3$ content (dry basis) | 11 |
| Particle density | 1.10 |
| Specific surface | 637 |
| Average pore diameter Å | 29.8 |

Example III

A catalyst prepared substantially as described in Example II was compared to a catalyst typical of that used in commerce for catalytic cracking under the following fluidized fixed bed conditions:

| | |
|---|---|
| Temperature °C | 538 |
| Pressure | Atmospheric |
| Process period min | 10 |
| Weight hourly space velocity | 2.5 |
| Diluent steam in reactor Per cent by weight | 10 |
| Diluent steam in regenerator gas mol per cent | 10 |

The properties of the catalysts were as follows:

|  | Catalyst According to Example II | Catalyst typical of that used in Commerce |
|---|---|---|
| Aluminum Content, per cent by weight | 24.2 | 10.0 |
| Specific Surface, m.²/gm | 472 | 490 |
| Particle Density, gm./cc | 0.867 | 1.10 |
| Average Pore Diameter, Å | 60.8 | 38.8 |

The process cycle was repeated until the total duration of the tests exceeded 500 hours with each catalyst. The surface areas of the catalysts after various time intervals and also the relative activity of the catalyst according to Example II (expressed as percent of the activity found with the other catalyst at the same time interval) are given in the following tabulation:

| Time, hours | Catalyst According to Example II | | Catalyst typical of that used in Commerce, Surface, m.²/gm. |
|---|---|---|---|
| | Relative Activity | Surface, m.²/gm. | |
| 0 | | 472 | 499 |
| 19 | 150 | 382 | 340 |
| 32 | 170 | 383 | |
| 50 | 195 | | 321 |
| 65 | 215 | 332 | |
| 100 | 235 | | 283 |
| 129 | 220 | 299 | |
| 200 | 220 | | 235 |
| 258 | 230 | 280 | |
| 410 | 240 | 236 | 211 |
| 529 | 240 | 236 | |
| 585 | | | 200 |

The above results illustrate the superior retention of activity and surface of the catalyst of the invention under relatively severe cracking conditions.

The superior stability of the catalyst of the invention against deactivation by steam at high temperatures is also illustrated in the following comparative results.

A catalyst prepared as described in Example II and the two catalysts typical of that used in commerce were subjected to the action of steam at 1 and 2 atmosphere pressure at 565° C. for 24 hours. The properties of the catalysts used for comparison were as follows:

|  | Catalyst | |
|---|---|---|
|  | A | B |
| Aluminum Content, per cent | 14.3 | 11 |
| Particle Density, gm./cc | 1.36 | 1.10 |
| Specific Surface, m.²/gm | 520 | 594 |
| Average Pore Diameter, Å | 23.2 | 32.0 |

The relative activities and the surface areas before and after such treatments are given in the following tabulation:

| Steam Treatment | Example II | | Catalyst | | | |
|---|---|---|---|---|---|---|
| | | | A | | B | |
| | Activity | Surface | Activity | Surface | Activity | Surface |
| None | 116 | 493 | 100 | 520 | 96 | 594 |
| 1 Atm | 83 | 346 | 48 | 219 | 45 | 291 |
| 2 Atm | 68 | 272 | 34 | 157 | | |

In the above description and in the following claims the properties of the catalyst given all relate to the fresh catalyst precalcined at a temperature of about 565° C. for 6 hours. It will be appreciated that all high-surface silica-alumina catalysts gradually become less active during use and that this change in activity is caused by or accompanied by a change in the properties, the extent and character of the change being determined by the particular catalyst and the particular conditions used. While the catalyst of the present invention becomes deactivated during use with concomitant change in properties it has been found that the rate of deactivation and concomitant change in properties is appreciably lower than in the case of the hitherto-known and used catalysts of the general type.

The invention claimed is:

1. A catalyst for the catalytic cracking of hydrocarbon oils consisting essentially of a substantially homogeneous synthetic silica-alumina composite having between 18% and 38% by weight of alumina, an average pore diameter of at least 50 Å, a surface of at least 400 m.²/gm., and a particle density below 0.95 gm./cc.

2. A catalyst for the catalytic cracking of hydrocarbon oils consisting essentially of a substantially homogeneous synthetic silica-alumina composite having between 20% and 35% by weight of alumina, an average pore diameter between 55 Å and 75 Å, a surface of at least 400 m.²/gm., and a particle density between 0.71 and 0.89 gm./cc.

LLOYD B. RYLAND.
MIROSLAV TAMELE.

REFERENCES CITED

The following references are of record in the file of this patent:

UNITED STATES PATENTS

| Number | Name | Date |
|---|---|---|
| 1,939,647 | Arnold et al. | Dec. 19, 1933 |
| 2,078,945 | Houdry | May 4, 1937 |
| 2,107,710 | Perkins et al. | Feb. 8, 1938 |
| 2,324,518 | Klein et al. | July 20, 1943 |
| 2,347,216 | Peterkin | Apr. 25, 1944 |
| 2,347,231 | Stoewener | Apr. 25, 1944 |
| 2,356,576 | Free et al. | Aug. 22, 1944 |
| 2,363,231 | Connolly | Nov. 21, 1944 |
| 2,384,942 | Marisic | Sept. 18, 1945 |
| 2,391,482 | Ruthruff | Dec. 25, 1945 |
| 2,405,408 | Connolly | Aug. 6, 1946 |